March 11, 1947. J. P. MACKIE 2,417,258
MACHINE FOR WINDING YARN
Filed May 4, 1944 5 Sheets-Sheet 1

Inventor
J. P. MACKIE
By
Attorneys

March 11, 1947.  J. P. MACKIE  2,417,258
MACHINE FOR WINDING YARN
Filed May 4, 1944  5 Sheets-Sheet 2

Inventor
J. P. Mackie
By
Attorneys

March 11, 1947.                J. P. MACKIE                2,417,258
                        MACHINE FOR WINDING YARN
                    Filed May 4, 1944           5 Sheets-Sheet 3
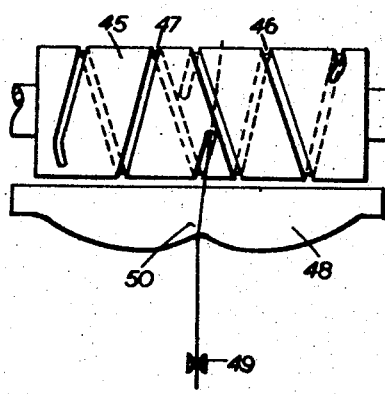
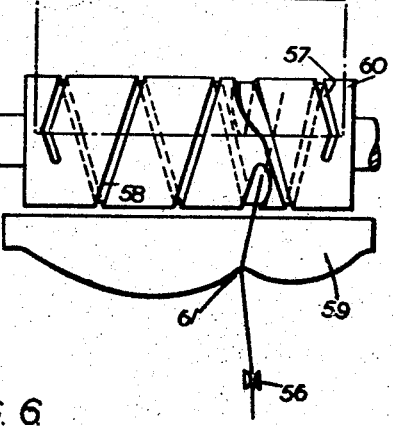
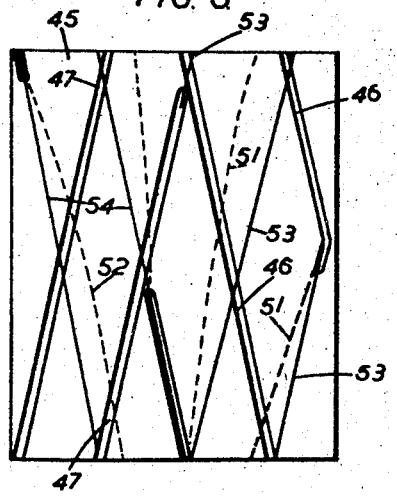
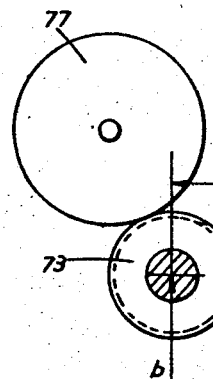
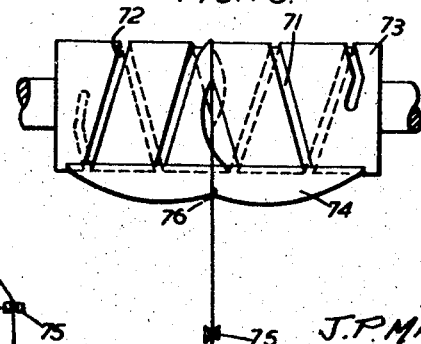
Inventor
J. P. MACKIE,
By
Attorneys March 11, 1947.  J. P. MACKIE  2,417,258
MACHINE FOR WINDING YARN
Filed May 4, 1944  5 Sheets-Sheet 4
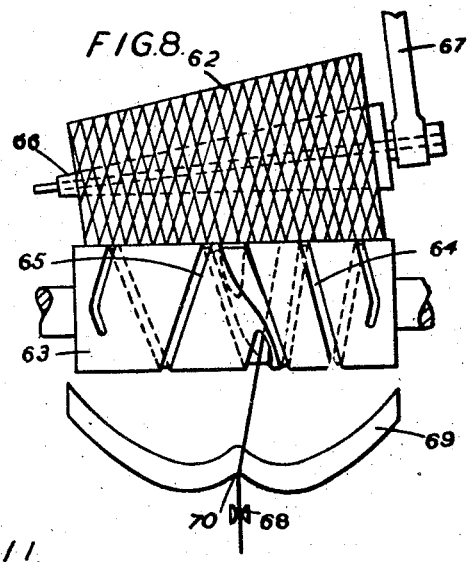
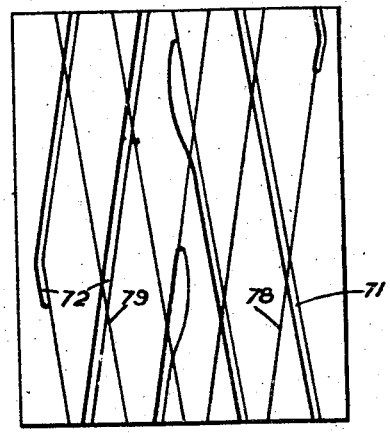
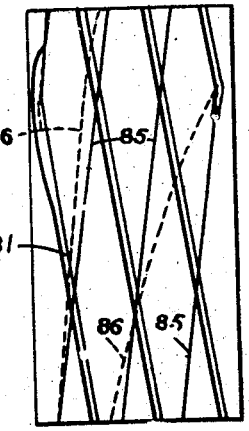
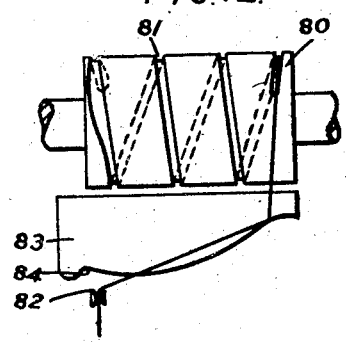
Inventor
J. P. MACKIE
By
Emery Holcombe of Slau
Attorneys

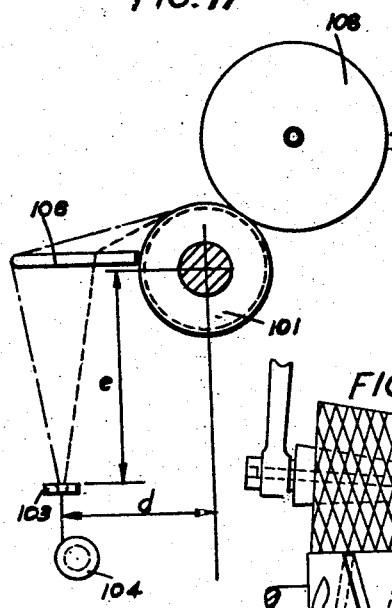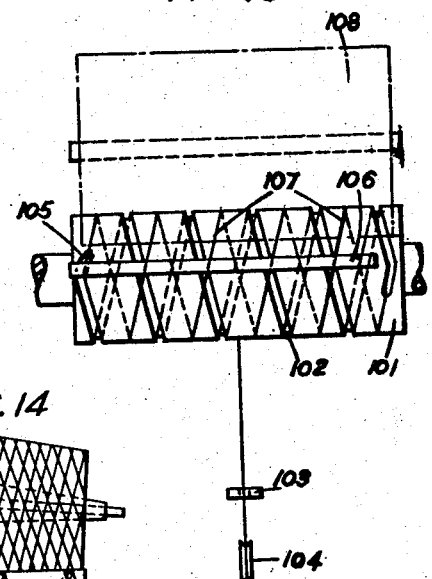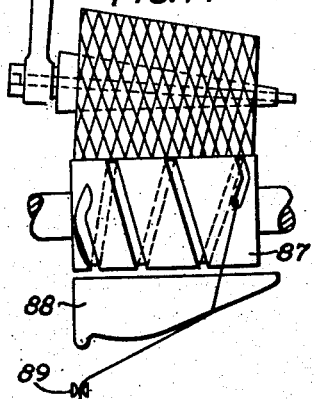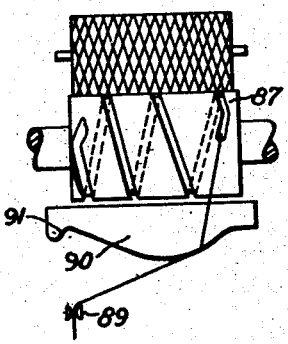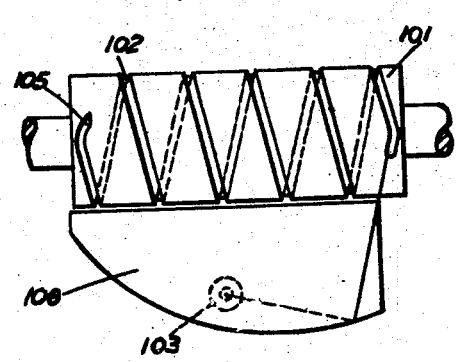

Patented Mar. 11, 1947

2,417,258

UNITED STATES PATENT OFFICE 2,417,258

MACHINE FOR WINDING YARN

John Pringle Mackie, Belfast, Northern Ireland, assignor to James Mackie and Sons Limited, Belfast, Northern Ireland, a British company Application May 4, 1944, Serial No. 534,104
In Great Britain May 10, 1943

4 Claims. (Cl. 242—43)

This invention relates to winding devices for cross winding rolls of yarn which may be either cylindrical or tapering. The winding devices are of the type in which a helically grooved roller is used for effecting a part of the traverse of the yarn. According to this invention the grooved roller has either one or two helical grooves in its surface without intersections, either for causing the yarn to be traversed in one direction only, or for causing the yarn to be traversed in opposite directions from an intermediate position, while a stationary yarn guide or delivering device for the yarn is used, and a shaped breastplate is disposed between the yarn delivering device and the grooved roller, the position of the yarn delivering devices and the breastplate, and the shape of this breastplate being such as to control the whole of the return travel of the yarn from the leaving end of the groove back toward its starting end in the case of a roller with one groove, or back toward the starting end of an oppositely directed groove when the roller has two such grooves. The grooves may terminate near the outer end or ends of the roller in short backwardly directed lengths in order to start the return travel of the yarn accurately, but under no circumstances is there a return groove crossing the outgoing groove, the pull of the yarn from the yarn delivering device over the surface of the breastplate being relied upon entirely to control the return traverse of the yarn over the surface of the roller.

It will be convenient to use the term "guide eye" throughout to indicate the stationary yarn delivering device, although this is not necessarily an eye or loop but may be a small tensioning roller or any other convenient form of stationary yarn guide.

The object of the breastplate is to regulate the return travel of the yarn so as to render the winding more even than it would be under the pull from the guide eye alone. In the most general cases in which two oppositely directed helical grooves are used with a guide eye in a plane approximately in line with the starting ends of the helical grooves the breastplate may have two curved surfaces meeting at a dip or valley in the middle. Apart from the breastplate the pull of the yarn from the guide eye tends to cause the yarn to traverse more rapidly and therefore at a wider pitch at the start of each return traverse, the pitch becoming less until there ceases to be any lateral drag on the yarn when it reaches the plane of the guide eye. Each curved surface of the breastplate is then so shaped as to impose a drag on the traverse of the yarn when the return traverse begins from each end of the roller, the drag diminishing as the curvature decreases, and then when the curvature reverses the yarn is actually helped in the last part of its traverse toward the plane in which the guide eye lies. By suitably shaping the breastplate it is possible to cause the yarn to be wound in the return traverse in evenly spaced spirals corresponding precisely with the outgoing spirals under the control of the grooves in the roller. Alternatively, the breastplate may control the return winding so as to give any required distribution of the yarn, causing the return traverse for instance to be effected in one more turn of the roller than the outgoing traverse or vice versa.

In all cases where two oppositely directed helices are used on the roller, the yarn is first caused to traverse by one helical groove to one end of the roller, is then brought back by the pull from the guide eye under the control of the breastplate to the plane in which the starting end of the other helical groove lies, and is accurately deposited after the required number of turns in the starting end of this groove which causes it to complete the traverse to the other end of the roller.

It is possible, however, to make use of the invention with a roller having a single helical groove in its surface and with the guide eye either displaced in a plane toward one end of the roller or placed in an intermediate position, the breastplate serving to control the return traverse of the yarn. If the single groove in the roller is of substantially uniform pitch the breastplate is curved so as to impose a drag on the return travel of the yarn in the first part of the traverse, and actually to accelerate the travel of the yarn in the last part of the traverse under the pull from the guide eye. In this way the yarn can be caused to be wound in the return traverse in substantially uniformly spaced spirals which may correspond in number and pitch with those of the grooves on the roller, or may be of greater or less pitch.

Various other alternatives are possible within the scope of the invention as will appear from the description of several alternative constructions with reference to the accompanying drawings, wherein:

Figure 5 is a plan view similar to Figure 3, of a modified arrangement;

Figure 6 is a development of the surface of the grooved roller shown in Figure 5;

Figure 7 is a plan view, similar to Figure 3, of a further modified arrangement;

Figure 8 is a plan view of a construction adapted for winding the yarn in a conical or tapering roll;

Fig. 9 is a somewhat diagrammatic side view of an arrangement according to the invention modified to wind a cylindrical roll of yarn.

Fig. 10 is a corresponding plan view thereof.

Figure 11 is a development of the surface of the grooved roller shown in Figure 10;

Figure 12 is a plan view of a further modification using a grooved roller with one helical groove only, and Figure 13 is a development of the surface of the grooved roller shown in Figure 12;

Figures 14 and 15 are plan views of other alternative arrangements, Figure 14 showing the winding of a taper roll, and Figure 15 the winding of a parallel roll, using the same form of grooved roller;

Fig. 16 is a front view of another alternative arrangement according to the invention, using a roller with a single helical groove;

Fig. 17 is a side view thereof.

Fig. 18 is a plan view of the arrangements of Figs. 16 and 17.

Figure 3:
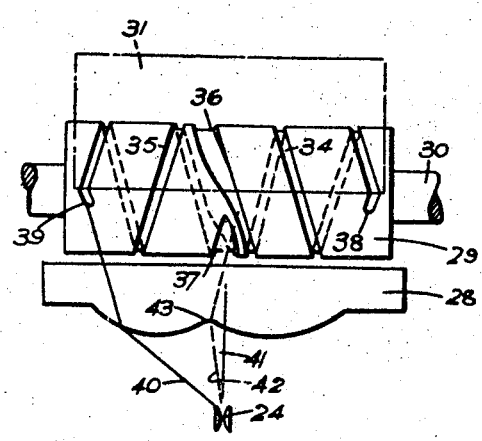
Figure 3 is a plan view of part of the thread guide roller and breast plate.

Referring to Figures 1 to 4, the yarn is shown as being supplied from a bobbin 25 through a guide 26 to a tension device 27 on arm 23, which also carries the guide eye 24. From this the yarn passes over the face of a breastplate 28 shaped as seen in Figure 3, to reach the surface of the grooved roller 29. The roller 29 is mounted on a shaft 30 driven by suitable means (not shown) and the yarn after passing over the roller 29 is wound on a roll 31 driven in this case by resting on the surface of the grooved roller 29. The roll 31 is carried by a suitable arbor between arms 32 pivoted at 33 but any other suitable means of supporting the roll 31 may be adopted.

Figure 1:
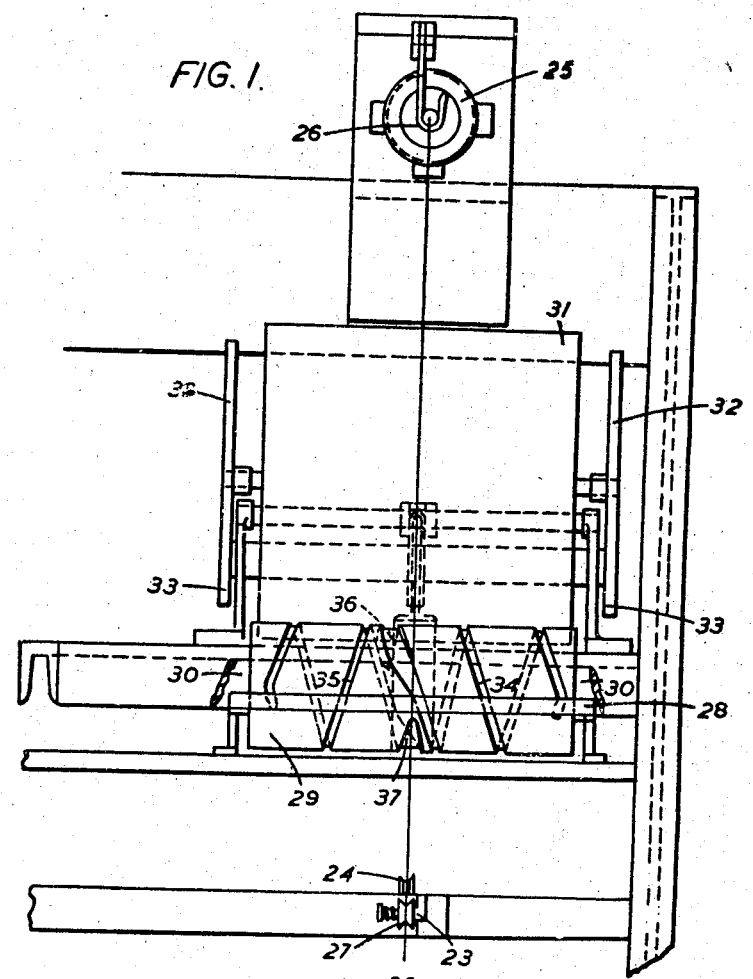
Fig. 1 is a somewhat diagrammatic front view of a typical winding arrangement according to the invention.
Figure 4:
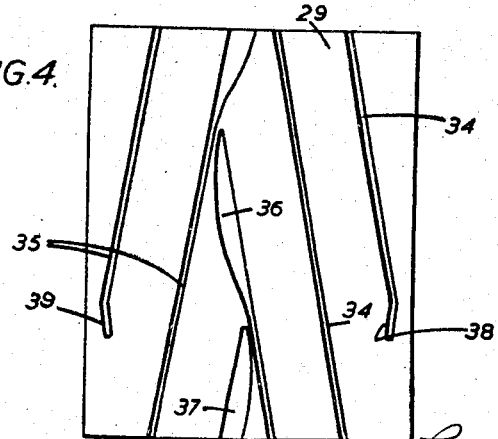
Figure 4 is a development of the surface of the grooved roller of Figures 1 to 3.
Figure 2:
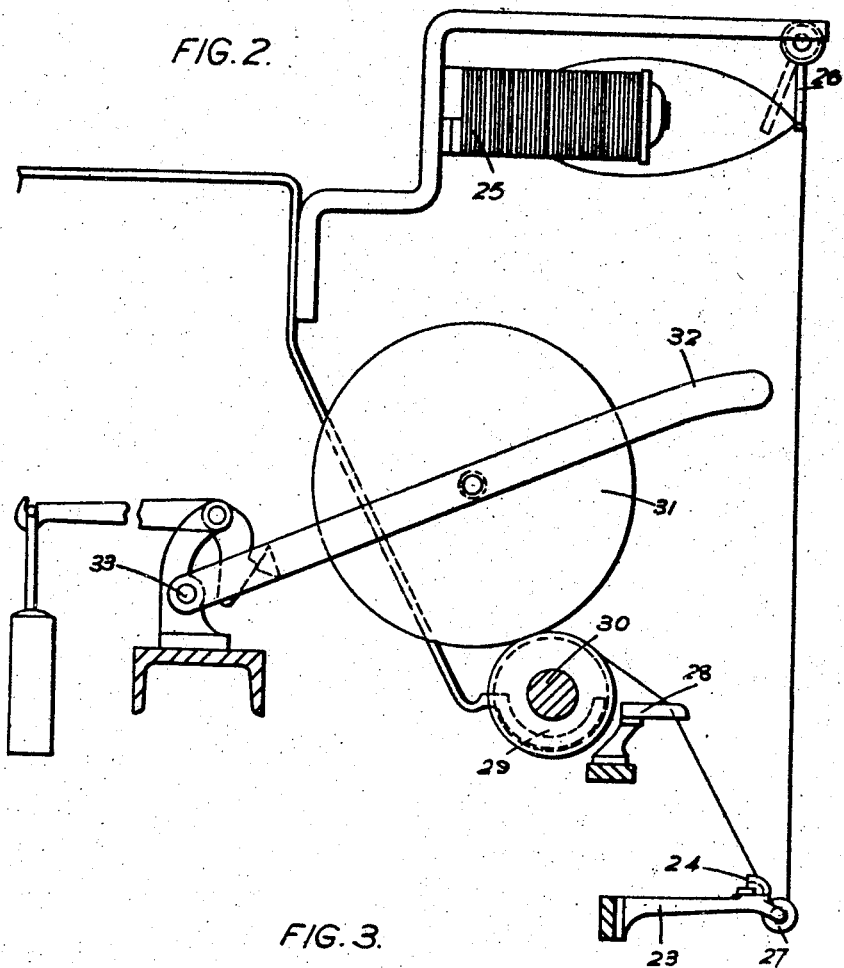
Fig. 2 is a corresponding side view thereof.

The roller 29 has two oppositely directed helical grooves 34 and 35 in its surface of a form seen best in Figure 4. The starting end of groove 34 is numbered 36 and it overlaps the starting end 37 of groove 35. Each groove 34, 35 extends out to near the end of the roller and terminates in a short return section 38, 39 respectively serving to start the return traverse of the yarn, but when the yarn leaves the end 38 or 39 it has to travel over the surface of the roller 29 without guidance therefrom until it falls into the starting end 36 or 37 of the other helical groove. It is the function of the breastplate 28, in conjunction with the pull of the yarn from the guide eye 24, to control the return travel of the yarn. The manner in which the control is effected can best be seen by reference to Figure 3.

Assuming the yarn to have just entered the splayed end 37 of groove 35, it is carried out to the left hand end of the roller by this groove 35 and is released at the return end 39. At this stage it is being pulled over the breastplate 28 as indicated by the full line 40, and the outward curve of the breastplate serves to retard the return traverse under the pull from the guide eye until the line of the yarn passes over the bulge, after which its traverse is accelerated by the inward curve of the breastplate into the dip or valley 43. As it reaches the dip 43, as shown by the dotted line 42, the yarn falls into the starting end 36 of the groove 34 and is traversed out to the righthand end of the roller by the groove 34, being released at the return end 38 of the groove 34. Here again the return traverse is at first retarded by the righthand bulge of the breastplate and then accelerated as indicated by the chain-dotted line 41, until it drops into the splayed starting end 37 of groove 35. The cycle then repeats, the curved surfaces of the breastplate 28 controlling the return traverse from each side back toward the central plane, and the curvature being such that the yarn is wound in equally pitched helices, or approximately so, in both directions.

It will be seen that in the example illustrated the guide eye 24 is in a plane corresponding approximately with that of the end 37 of groove 35, but the dip or valley 43 in the breastplate is to the left of this and nearer to the plane through the starting end 36 of groove 34, so that the yarn is deflected as shown in dotted lines at 42. This insures its entry into the splayed end 37 of groove 35 on its return from the righthand end, and its entry into the splayed end 36 of groove 34 on its return traverse from the lefthand end. The distance of the guide eye 24 from the roller 29 and the curvature of the breastplate are made such that the yarn travels from the end 38 of groove 34 back to the starting end 37 of groove 35, and rather less than two turns as the yarn returns from the end 39 of groove 35 to drop into the starting end 36 of groove 34. The overlap of the end 36 is responsible for this, as it gives groove 34 rather more than two turns round the roller 29. There are thus four turns of yarn wound on the roll 31 in each layer, and these turns are substantially of uniform pitch throughout.

Referring now to Figures 5 and 6, the roll 45 there shown has two grooves 46 and 47 of constant pitch, say 3 inches between turns, and their inner ends overlap but are not shown as being splayed as that is not essential. The breastplate 48 and guide eye 49 are similar to those of Figures 1 to 4, the valley 50 of the breastplate lying in a plane between the starting ends of the grooves 46 and 47. If no breastplate were used and with the guide eye 49 in the position shown, the return travel of the yarn from the ends of grooves 46 and 47, over the surface of the roller 45, would be as indicated by the dotted lines 51 and 52, Figure 6, the guide eye being so placed as just to bring back the yarn into the starting ends of the grooves 46 and 47. The lines 53 and 54 show the paths of the return travel of the yarn when the breastplate is used. The pitch is less than the outgoing pitch in this case, namely about 2⅝ inch per turn in the return helices, but that is no disadvantage as the yarn is evened out in pairs of layers so that the distribution is substantially uniform.

The starting ends of the helical grooves need not be in a central position in the roller but may be nearer to one end than the other. This is illustrated in Figure 7 where the roller 60 has two grooves 57 and 58, of which groove 57 occupies only about 1½ turns while groove 58 occupies nearly 3 turns. The guide eye 56 is approximately in line with the end of the flare of groove 58, and the breastplate 59 has its valley 61 in a plane between the two flares. The bulge in the lefthand portion of the breastplate is larger than that to the right, as is necessary to impose more drag on the return travel of the yarn from the lefthand end where it would otherwise extend at a steep angle to the guide eye 56. The pitch of the helices is approximately uniform over the whole length of the roll to be wound in this case.

Figure 8 shows a form of grooved roller and breastplate adapted for use in winding a taper or conical roll 62. The roller 63 has two grooves 64 and 65 whose pitch is smallest toward the righthand end and increases toward the lefthand end because more yarn should be wound on the thicker end of the roll 62 and less on the lefthand end where it is smaller in diameter. The roll 62 is shown as being supported on a tapering arbor 66 carried by an arm 67, and it is rotated by contact with the roller 63 as usual. The guide eye 68 is approximately in line with the splayed end of groove 64, and the valley 70 of the breastplate 69 is in the same plane as the guide eye in this case. In the return travel of the yarn from the lefthand end of the groove 65, the lefthand bulge of the breastplate 69 serves to spread the turns so that they follow a diminishing pitch more or less corresponding to the increasing pitch of the groove 65 from right to left, and the groove 64 when it takes charge of the yarn continues its traverse to the righthand end of the roll 62 at about the same rate of diminution of pitch. In the return traverse the righthand bulge of the breastplate 69 causes the yarn to be wound in a pitch like that of the groove 64 until it falls into the starting end of the groove 65 on reaching the valley 70.

Figures 9 to 11 illustrate a construction designed for winding cylindrical rolls, in which the starting ends of the grooves 71, 72 on the roller 73 are in line, while the valley 76 of the breastplate 74, and the guide eye 75 are all approximately on the same plane at right angles to the roller 73.

In an actual example of this construction which has been tried, the distance $a$ of the guide eye 75 in front of the vertical plane through the centre of the roller 73 was seven inches, and the vertical distance $b$ below the centre of the roller was five and three-eighths inches. The breastplate 74 was three-quarters of an inch above the horizontal plane through the centre of the roller 73, and its bulges, as indicated by the length $c$ in Figure 9, were three inches in front of the centre of the roller. The length of the roller 73 was such as to give a nine inch traverse, so winding a roll 77 nine inches long. The grooves 71 and 72 in the roller 73 have an outgoing pitch of two and a quarter inches, while the pull from the guide eye 75 over the bulges of the breastplate 74 caused the return traverse of the yarn over the surface of the roller to be at a pitch of one and thirteen sixteenths of an inch. The return traverses are indicated by the lines 78 and 79 in Figure 11. The dropping of the yarn into the valley 76 under the pull from the guide eye 75 is sufficient to ensure entry of the yarn into the starting ends of the grooves 71 and 72 respectively. These starting ends are at opposite sides of the roller 73, and of course the yarn drops into the one which first presents itself, this being in each case the one which will carry the yarn out to the opposite end of the roller.

When winding rolls of short lengths such as six inches, it is possible to use a helically grooved roller with a single helix upon it, and with the guide eye displaced toward one end of the grooved roller. Such a construction is shown in Figures 12 and 13, where the roller 80 has a single helical groove 81 and the guide eye is in a plane opposite the starting end of this groove, while the breastplate 83 has a single bulge with a valley 84 to the left of the plane through the guide eye. In the example shown the groove 81 is of two inch pitch, and the shape of the breastplate is such as to cause the yarn to return in coils also of two inch pitch, as indicated by the lines 85 in Figure 13. Apart from the breastplate the yarn would return to the starting end in two turns of varying pitch along a line such as is indicated by the dotted track 86 in Figure 13. This would give a roll of unequal density tending to be hard toward the lefthand end, and this is completely avoided by the use of the breastplate 83.

Figure 14 shows a similar construction to Figure 12 but adapted for winding a taper roll instead of a parallel one. The roller 87 has a groove of varying pitch designed for winding a taper roll say six inches long, the varying pitch giving a traverse of about one and a half inches for the first turn, two inches for the second turn and two and a half inches for the third turn. The breastplate 88 is so shaped in conjunction with the position of the guide eye 89 that the yarn is returned over the surface of the roller from the outer end of the groove therein in turns of diminishing pitch reproducing the outgoing turns substantially. The result is to give a taper roll of uniform density throughout its length, while taking account of the increasing amount of yarn to be laid upon it at the larger end.

Figure 15 shows the same roller 87 used in this case to wind a parallel roll of yarn. All that is necessary for this purpose is to change the breastplate, the new breastplate 90 having a bulge toward the righthand side and a valley 91 toward the left. The effect of the breastplate is to cause the yarn to wind from the righthand end with a small pitch first and an increasing pitch as it nears the lefthand end so as to counterbalance the increasing pitch of the yarn in the outward traverse effected by the groove in the roller 87.

Figures 16, 17, and 18 show an arrangement in which the grooved roller 101 has a single helical groove 102 and a guide eye 103, to which the yarn passes from the tensioning device 104 which is in an approximately central position. Without a breastplate of course the yarn would never be displaced toward the starting end 105 of the groove 102. With a breastplate 106 of the form seen in Figure 18 the return traverse of the yarn is controlled and it is caused to travel out toward the lefthand end around the curve of the breastplate until it enters the starting end 105 of the single groove. The line 107 drawn on the surface of the roller in Figure 16 indicates the approximate return path of the yarn over the surface of the roller under the control of the breastplate 106, the pitch being the same as that of the groove 102. A roll 108, ten inches in length, can be wound in this way. In a practical example in accordance with Figures 16, 17, and 18, the centre of the guide eye 103 was at a distance $d$, Figure 17, amounting to four and seven eighths inches in front of the plane through the centre of the roller 101, and the guide eye was at a distance $e$, six and three quarters inches below the centre of this roller. The breastplate was slightly above the centre of the roller 101 as seen in Figures 16 and 17.

The examples described will sufficiently indicate the way in which the invention can be applied using rollers either with a single helical groove or with two oppositely directed helical grooves without any crossing point between them, and with a guide eye in various possible positions, while the return traverse of the yarn from the far end of a groove back either to the starting end of the same groove or to the starting end of an oppositely directed helical groove is effectively controlled by the pull of the yarn from the guide eye passing over the surface of a breastplate. Many other arrangements are possible besides those described and illustrated, but these can be developed on the principles already described to comply with any usual requirements in the winding of either parallel or tapering rolls of yarn. It is the curved guiding surface of the breastplate which is of importance, and it is not necessarily made as a plate but may be a bar as in Figure 8, and may be supported in any convenient manner. Both the guide eye and the breastplate may be adjustably mounted so as to enable them to be set accurately to the best position for operation in each case.

Although the roll of yarn has been shown throughout as being driven by contact with the surface of the grooved roller, any other usual methods of driving a spindle carrying the roll to be wound may be adopted. The advantage of driving it by contact with the roller is that the surface speed is maintained substantially uniform as the roll increases in diameter. In the case of a tapering roll the speed at which it tends to turn is intermediate between that at which the narrower end and the larger end would be driven, some slip occurring at both ends to enable the intermediate speed to be attained.

I claim:

1. In a winding device for cross-winding rolls of yarn, the combination of a guide member for the yarn, a roller with a helical groove in its surface free from crossing points with other grooves, means for rotating said roller, an arbor for supporting the roll of yarn as it is wound, and a breastplate between said guide member and said helically grooved roller, said breastplate having an outwardly bulged curved surface over which the yarn is stretched in its passage to the said helically grooved roller, the pull of the yarn from said guide member under the control of the curved surface of the breastplate being adapted to control the return traverse of the yarn over the surface of the helically grooved roller, after it leaves the groove therein adjacent an end of said roller, said surface of the breast plate being shaped to retard the traverse of the yarn in the first part of its return while the stretch of the yarn over said breast plate is increasing, and to accelerate the traverse of the yarn in the last part of its return in which the stretch of the yarn over said breast plate is becoming less.

2. In a winding device for cross-winding rolls of yarn, the combination of a guide member for the yarn, a roller with a helical groove in its surface free from crossing points with other grooves, means for rotating said roller, an arbor for supporting the roll of yarn as it is wound, and a breastplate situated between said guide member and said helically grooved roller, said breastplate having an outwardly bulging curved surface over which the yarn is stretched in its passage to said helically grooved roller, a part of said curved surface being inclined to the axis of the helically grooved roller in a direction such as to impose a drag on the traverse of the yarn thereover, and another part being inclined to said axis in a direction such as to accelerate the traverse of the yarn under the pull from said guide member to the surface of said helically grooved roller, whereby the return traverse of the yarn when it is free from the control of the groove in said roller is rendered more uniform.

3. A winding device for cross-winding rolls of yarn, comprising a stationary guide member for the yarn, a roller with two helical grooves in its surface which are oppositely directed from an intermediate position toward opposite ends of said roller, and which are free from intersections, a breastplate situated between said guide member and said roller, said breastplate having two outwardly bulged surfaces with a valley between them, means for rotating said roller, and an arbor adapted for supporting a roll of yarn to be wound, the outwardly bulged surfaces of said breastplate being adapted to control the return traverse of the yarn from the ends of said roller toward the intermediate position and into the starting ends of the oppositely directed grooves therein.

4. A winding device for cross-winding rolls of yarn, comprising a stationary guide member for the yarn, a roller with two helical grooves in its surface extending in opposite directions from an intermediate zone toward the ends of the roller and free from intersections therein, a breastplate situated between said guide member and said roller, said breastplate having two outwardly curved surfaces meeting in a valley in an intermediate position, over which curved surfaces the yarn passes in its passage from said guide member to said roller, and an arbor adapted to support a roll of yarn while being wound, the drag imposed on the traverse of the yarn by the outwardly curved surfaces of said breastplate being such as to even out the return traverse of the yarn under the pull from said guide member, while the valley in said breastplate is so situated as to cause the returning yarn to enter the starting end of the oppositely directed helical groove in said roller.

JOHN PRINGLE MACKIE.

REFERENCES CITED

The following references are of record in the file of this patent:

UNITED STATES PATENTS

| Number | Name | Date |
|---|---|---|
| 2,156,472 | Dersen | May 2, 1939 |

FOREIGN PATENTS

| Number | Country | Date |
|---|---|---|
| 817,937 | French | June 7, 1937 |